(No Model.)
L. M. EVANS.
SWINGING GATE.
No. 253,593. Patented Feb. 14, 1882.
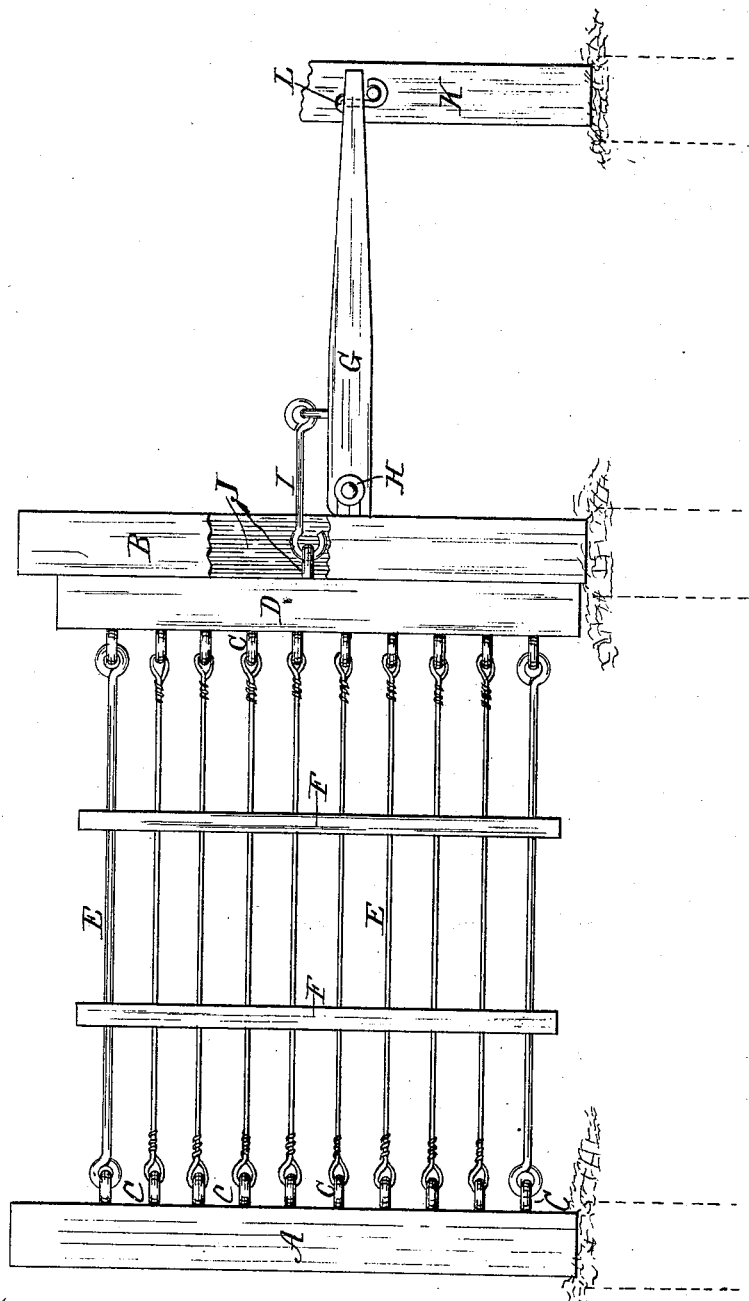
Witnesses:
F. M. Burnham
J. F. Munson
Inventor:
Lindley M. Evans
By Daniel Breed Atty.
N. PETERS, Photo-Lithographer, Washington, D. C.

UNITED STATES PATENT OFFICE.

LINDLEY M. EVANS, OF CASS TOWNSHIP, (REEDER'S MILLS P. O.,) HARRISON COUNTY, IOWA.

SWINGING GATE.

SPECIFICATION forming part of Letters Patent No. 253,593, dated February 14, 1882.

Application filed August 26, 1881. (No model.)

*To all whom it may concern:*

Be it known that I, LINDLEY M. EVANS, of Cass township, in the county of Harrison (Reeder's Mills P. O.) and State of Iowa, have made certain new and useful Improvements in Farm-Gates, of which the following is a specification.

The accompanying drawing represents a side view of my improved gate.

My invention consists in a novel construction and arrangement of hingeless wire gate, which will be fully understood by the following description and claim.

The two gate-posts A and B may be set into the ground in the usual manner. Into the post A are inserted a series of screw-eyes, C, and a corresponding series of screw-eyes are inserted into the upright piece D, and the wires E are attached to these screw-eyes, as seen in the drawing. The wires carry two stay-pieces, F, to prevent hogs or other animals separating the wires when the gate is closed, and also to prevent the wire from being tangled in opening and shutting the gate.

Attached to the post B is a stretching-lever, G, pivoted at H, and provided with a hook, I, to be hooked into a staple or screw-eye, J, on post D, projecting in the mortise of post B, as seen in the drawing.

Upon the post K is a hook, L, for fastening the end of lever G after the gate is closed and the wires stretched by bearing down the lever G, as shown in the drawing.

The above gate is simple, cheap, and yet convenient and durable.

Having described my invention, what I claim is—

The herein-described gate, consisting of stationary upright A and movable upright D, connected together by wires E, mortised upright B, lever G, fulcrumed to said upright B, and connected to upright D by hook I, substantially as specified.

In testimony whereof I affix my signature in presence of two witnesses.

LINDLEY M. EVANS.

Witnesses:
L. I. KING,
H. H. ROADIFER.